Dec. 17, 1929.　　　E. W. KELLOGG　　　1,740,406

SOUND RECORDING APPARATUS

Filed Jan. 23, 1928

Inventor
Edward W. Kellogg,
by Charles E. Tullar
His Attorney.

Patented Dec. 17, 1929

1,740,406

UNITED STATES PATENT OFFICE

EDWARD W. KELLOGG, OF SCHENECTADY, NEW YORK, ASSIGNOR TO GENERAL ELECTRIC COMPANY, A CORPORATION OF NEW YORK

SOUND-RECORDING APPARATUS

Application filed January 23, 1928. Serial No. 248,719.

My invention relates to apparatus for photographically recording vibrations on a moving light-sensitive member and particularly to apparatus for making a record in the form of a band on a moving film by means of a beam of light which is caused to vary in accordance with the vibrations to be recorded.

For the faithful recording of vibrations having relatively high frequencies, such for example as those representing the overtones in certain sound waves with moderate film speeds, the light beam by which the exposure is made must be extremely narrow in the direction of the movement of the film at the point where it engages the film. In apparatus heretofore constructed a common way of limiting the width of the light beam engaging the film has been by the use of a screen arranged close to the moving film having a light aperture therein of the desired width. It has also been proposed to form on the film by means of a lens or lenses a reduced image of a distant light aperture or slit, and to vary either the intensity of illumination of the entire slit or else to vary the length of the illuminated portion of the aperture, in accordance with the vibrations to be recorded. The fact that the slit or image of a slit through which light reaches the film must be very narrow means that the time of exposure of any given part of the film will be very short, namely, the time required for the film to move a distance equal to the width of the slit. The intensity of illumination must therefore be high if the film is to receive adequate exposure. There are a number of systems of recording in which the intensity of illumination of the slit varies from instant to instant, but the distribution of light along the length of the slit does not change. This produces what may be called a variable density record. Such a record, consisting as it does of areas of film of varying degrees of opacity, requires proper exposure and development if serious distortion of the reproduced sound is to be avoided.

Figure 3:
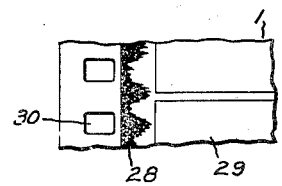

There is another type of record, however, in which the exposed portion of the film varies in width, and only two degrees of film opacity are employed, preferably the one as clear as possible and the other black enough to permit only a small fraction of the incident light to be transmitted. The general appearance of such a film is illustrated in Fig. 3 of the drawing to be described later. This type of record has the advantage that variations in exposure or in development either of the negative or of prints made therefrom do not result in wave shape distortion but only in changes of intensity. It is in the making of variable width records that difficulty is encountered in obtaining sufficient light intensity to expose the film to the desired degree. The simplest method of producing variable width record is to use a rocking mirror such as is employed in the electrical oscillograph and cause the vibratory rotation of the mirror to move a light spot across the slit so that a smaller or larger portion of the slit is illuminated, depending on the instantaneous position of the mirror.

In the arrangements hitherto in use the axis of rotation of the mirror has been perpendicular to the slit and the light spot has moved parallel to the slit. The total movement of the light spot should be nearly equal to the length of the slit when the loudest sounds are being recorded, and since there is a practical limit to the maximum angle through which the mirror can be rotated, the only way in which the light spot can be given the necessary motion is to locate the mirror not less than a certain distance from the slit.

Assuming that all of the light which passes through the slit reaches the film and is thus useful in giving exposure, the total useful light is approximately equal to the intrinsic brilliancy of the source, multiplied by the product of the areas of the mirror and slit, divided by the square of the distance between them. Interposing a lens has little effect if it is placed close to either the mirror or the slit. In other positions it increases the amount of light, but also reduces the movement of the light spot on the slit just as placing the mirror closer to the slit will increase the light and reduce the movement. Thus the introduction of a lens far enough from the slit and the mirror to give any appreciable magnification would have to be compensated by moving the mirror still further from the slit and the net gain is zero.

A cylindrical lens is frequently used with its axis at right angles to the axis of rotation of the mirror. In such a system the light paths must be analyzed separately in the two planes and the relationship is found to be that the mirror length measured parallel to the axis of rotation is not a factor, and that the first power of the distance between mirror and slit enters in the denominator instead of the square of this distance. The light is proportional to the product of two factors corresponding respectively to the two planes perpendicular and parallel to the axis of the cylinder. The first is the product of the width of the slit, the diameter of the lens by which the slit is imaged on the film, divided by the distance between the slit and lens, or if the slit is close to the film it is the product of slit width by the effective numerical aperture of the cylindrical lens. The second factor is mirror width by slit length divided by the distance between them, again assuming that no lens is so placed as to materially alter the movement of the light spot. Whichever lens system is used it is seen from the relations stated that the closer the mirror can be placed to the slit and still move the light spot enough to cover and uncover the entire slit, the more light will be available for exposing the film. Herein lies the advantage of the arrangement employed in my invention. By moving the light spot in a direction perpendicular instead of parallel to the slit, the light spot having an inclined edge, the slit can be illuminated over its entire length or over a small fraction of its length with relatively small movement of the light spot, and this permits placing the mirror close to the slit and thus passing more light.

It is the object of my invention therefore to provide an improved vibration recording apparatus which shall avoid the objections and difficulties of former apparatus of this character and shall be efficient and practicable.

My invention will be better understood from the following description taken in connection with the accompanying drawing, and its scope will be pointed out in the appended claims.

Figure 1:
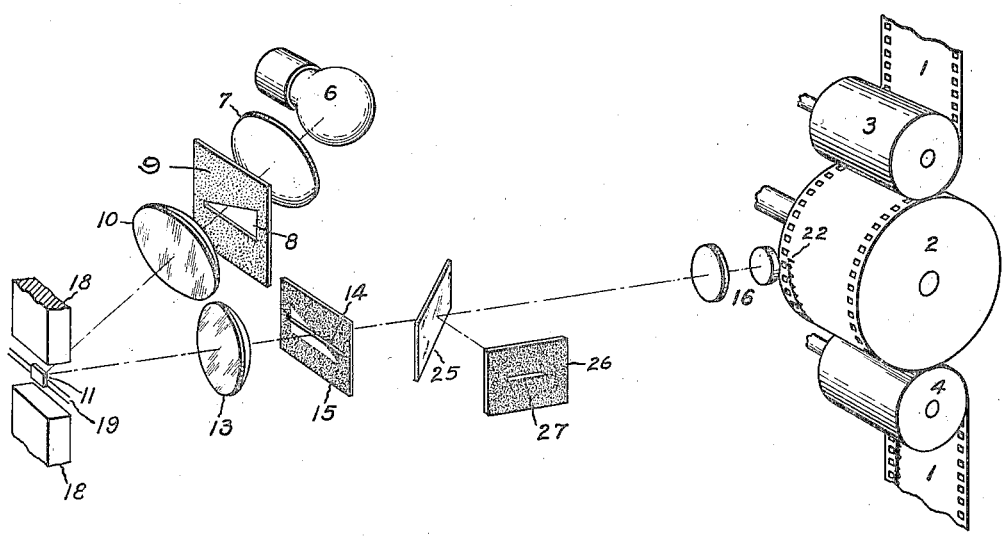
Figure 2:
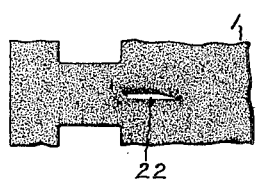

Referring to the drawing, Fig. 1 is a perspective view of one form of apparatus involving my invention; Fig. 2 shows a fragment of the film in Fig. 1, drawn to an enlarged scale, showing the light spot thereon as it appears when it is still; and Fig. 3 shows a fragment of the film after development, enlarged to a less extent than that of Fig. 2, with a sound and picture record thereon.

In the drawing I have shown the light sensitive member 1 as a film such as is commonly used for motion pictures and this is wrapped about portions of the supporting drum 2 and the two smaller rollers 3 and 4. The drum may be freely rotatable and be moved by the passage of the film thereover or it may be driven by the film driving mechanism, the essential feature in either case being that the successive portions of the film be supported at an unvarying distance from the adjacent lens system and be given a uniform movement. In accordance with the form of apparatus which I have illustrated, the film at the point where it is exposed to the varying light beam is moving substantially vertically and opposite this point is the means for varying the light beam in accordance with the vibrations to be recorded. As a source of light, I have shown the incandescent lamp 6 preferably one having a filament in the form of a ribbon, although good results can be obtained with a concentrated helical wire filament. Rays of light from the lamp 6 pass successively through the lens 7, opening 8 in screen 9, lens 10, to mirror 11 from which they are reflected through lens 13, opening 14 in screen 15 and the lens system 16 to the film. The screen 9 is so located that the lenses 10 and 13 form an image of the opening 8 in the plane of the screen 15. The opening 8 is shown for example as triangular so formed that it passes a triangular beam of light. However, the opening may have various other shapes or if desired the lower portion of the screen may be removed, the important feature being that the screen have an inclined edge so that the light spot reflected upon the screen 15 shall have a straight side which makes an acute angle with the opening or slit 14.

The mirror 11 is mounted to vibrate with an axis of rotation at right angles to the direction of movement of the film at the point of exposure thereof. Various means may be employed for vibrating the mirror in accordance with the vibrations to be recorded, for example if sound waves are to be recorded, the mirror may be directly connected with a sound actuated diaphragm such as shown in the Hoxie Patent 1,598,377, Aug. 31, 1926, or electromagnetic means may be employed to vibrate the mirror in accordance with certain electrical phenomena. A convenient and satisfactory means of vibrating the mirror consists in mounting the mirror on a pair of metal wires or strips, which carry current in opposite directions, the whole being placed in a transverse magnetic field. This is the construction employed for the oscillograph galvonameter which is particularly well adapted for the recording of high frequency vibrations, such for example as those representing the overtones of voice or musical sounds. For the recording of sounds I prefer to employ a suitable microphone pickup, the current vibrations from which after being amplified by suitable amplifying means are caused to actuate an oscillograph galvanometer. On the drawing I have shown the mirror 11 which is arranged with the mirror supporting wires 19 horizontal. The mirror is rectangular in shape having its longer dimension horizontal or in the direction of the axis upon which it vibrates. The conductors 19 react with the magnetic field between the pole pieces 18.

When the mirror is at rest, the galvanometer is so adjusted that approximately one half only of the slit 14 is illuminated and by reason of the small angle between the slit and the inclined edge of the light beam, mirror vibrations of very small amplitude are sufficient to cause the illuminated portion of the slit 14 to vary the full length of the slit. The optical system designated by 16, images the illuminated portion of slit 14 on the film on a greatly reduced scale, the image, shown at 22, comprising a line of light extending transversely of the film. The optical system 16 may comprise a single lens but I prefer to use a lens system comprising a plurality of lenses such as a microscope objective with which the slit 14 may readily be imaged on the film as a line of light having a width of the order of 1 mil. It will be noted that although this construction involves the use of a narrow light aperture or slit, the position of the slit is such that it does not collect dust and dirt from the film and since the dimensions of the slit are many fold greater than those of the line of light on the film, it is not difficult to keep the slit free from obstruction nor is it difficult to manufacture. One of the requirements of the apparatus described is that the lamp filament as viewed from the mirror must appear large enough to form a background behind the entire screen edge 18. To this end I have provided the lens 7 to magnify the filament to the required size. The requirement is most satisfactorily met if the lenses 7 and 10 form an image of the filament on the mirror. These lenses may, however, be dispensed with under certain conditions.

Only such light as after passing through the slit 14 enters the lens system 16 is useful in making the record on the film. It is therefore necessary to employ a lens 13 which will so bend the rays of light from the mirror that they will enter the lens 16. In general the mirror and lens 16 are approximately at conjugate focal distances from the lens 13. It is further necessary that the lens 13 have a diameter somewhat greater than the length of the slit 14 in order that as viewed from the lens 16 the slit 14 may appear to be completely illuminated, or at least as much of it as is covered by the light spot or image of the opening 8. The lens 13 may be on either side of the screen 15, but is preferably placed between the mirror and the screen 15, since in this location it does not impair the sharpness with which the lens 16 casts the image of the slit 14 on the film. A lens of somewhat better correction than the ordinary simple spherical condenser lens may be required at 13, particularly if in order to obtain high illumination of the film a lens of high numerical aperture is employed.

In order to facilitate focusing the image of the slit 14 on the film I have shown at 25 means for producing an enlarged visible image of the line of light on the film, comprising a thin piece of glass placed in the path of and at an angle of approximately 45° to the light beam, and a screen 26, as for example a piece of ground glass at one side of the glass 25. A small proportion of the light reflected from the film back through the lens system 16 is reflected laterally by the glass 25 to the screen 26 where it forms an enlarged image 27 of the light line 22. In place of a diffusing screen 26, an eye piece lens may be employed, the proper location for the lens being slightly farther from the glass 25 than that for the screen.

In Fig. 2 I have shown how a small fragment of the film 1 with light line 22 would appear if magnified and with the mirror motionless.

The fragment of film illustrated by Fig. 3 shows a sound record 28 such as that made by my apparatus and arranged along one edge of the film between the picture record 29 and the row of sprocket holes 30. It will be understood that the film 1 is unwound from and is wound on suitable reels and is at all times shielded from light except at the point at which the record is being made. The sound record, although actually invisible until after development, is shown in Fig. 1 as if it were visible for the sake of making the apparatus the more easily understood.

I have chosen the particular embodiment described above as illustrative of my invention and it will be apparent that various modifications may be made without departing from the spirit and scope of my invention which modifications I aim to cover by the appended claims.

What I claim as new and desire to secure by Letters Patent of the United States, is:

1. Apparatus for making a variable width sound record on a movable film comprising a source of light, a sound controlled oscillatable mirror arranged to reflect a light beam from said source toward the film and to vibrate it in the direction of movement of the film, a screen in the path of the reflected beam having a slit therein extending transversely of the direction of movement of the film, and means for giving to said beam a side making a small angle with said slit.

2. Apparatus for making a continuous variable width sound record on a longitudinally movable film comprising a source of light, a sound controlled oscillatable mirror arranged to reflect a light beam from said source toward the film, and to vibrate it longitudinally of the film, a screen in the path of the reflected beam having a slit therein extending transversely of the film, and a screen between the light source and the mirror for giving to the beam a side which is inclined at a small angle with said slit and which normally crosses the slit at the central portion thereof.

3. Apparatus for making a continuous variable width photographic record of sound comprising a movable film, a source of light, a sound controlled mirror arranged to reflect a light beam from said source to said film, means for causing the incident beam to have a relatively sharply defined side face, sound controlled means for vibrating the mirror in a plane substantially parallel to the direction of movement of the film, a screen positioned in the path of the reflected beam and provided with a slit arranged at a small angle with said side face whereby vibrations of the reflected light beam transversely of the slit produce magnified variations in the angle of the slit illuminated by the beam, and means for focusing on said film a reduced image of the illuminated portion of said slit.

4. Apparatus for making a continuous variable width photographic record of sound comprising a drum, a film supported thereby, a source of light, a sound controlled mirror arranged to rotate about an axis substantially parallel to the axis of the drum, for reflecting a light beam from the source toward the film, a screen between the mirror and the film having a narrow slit therein substantially parallel with the axis of the drum, means adjacent the film for focusing thereon a reduced image of the slit, and a screen between the mirror and the source of light having an inclined edge, the resulting inclined side of the reflected beam crossing the slit at a small angle, whereby small movements of the light beam reflected on the first mentioned screen result in large variations in the length of the illuminated portion of the slit therein.

In witness whereof, I have hereunto set my hand this 20th day of January, 1928.

EDWARD W. KELLOGG.